Sept. 14, 1937. W. C. WAGNER 2,093,178
ELECTRIC METER TESTING EQUIPMENT
Filed March 19, 1935 3 Sheets-Sheet 1

INVENTOR
Walter C. Wagner
BY
Augustus B. Stoughton
ATTORNEY

WITNESS:

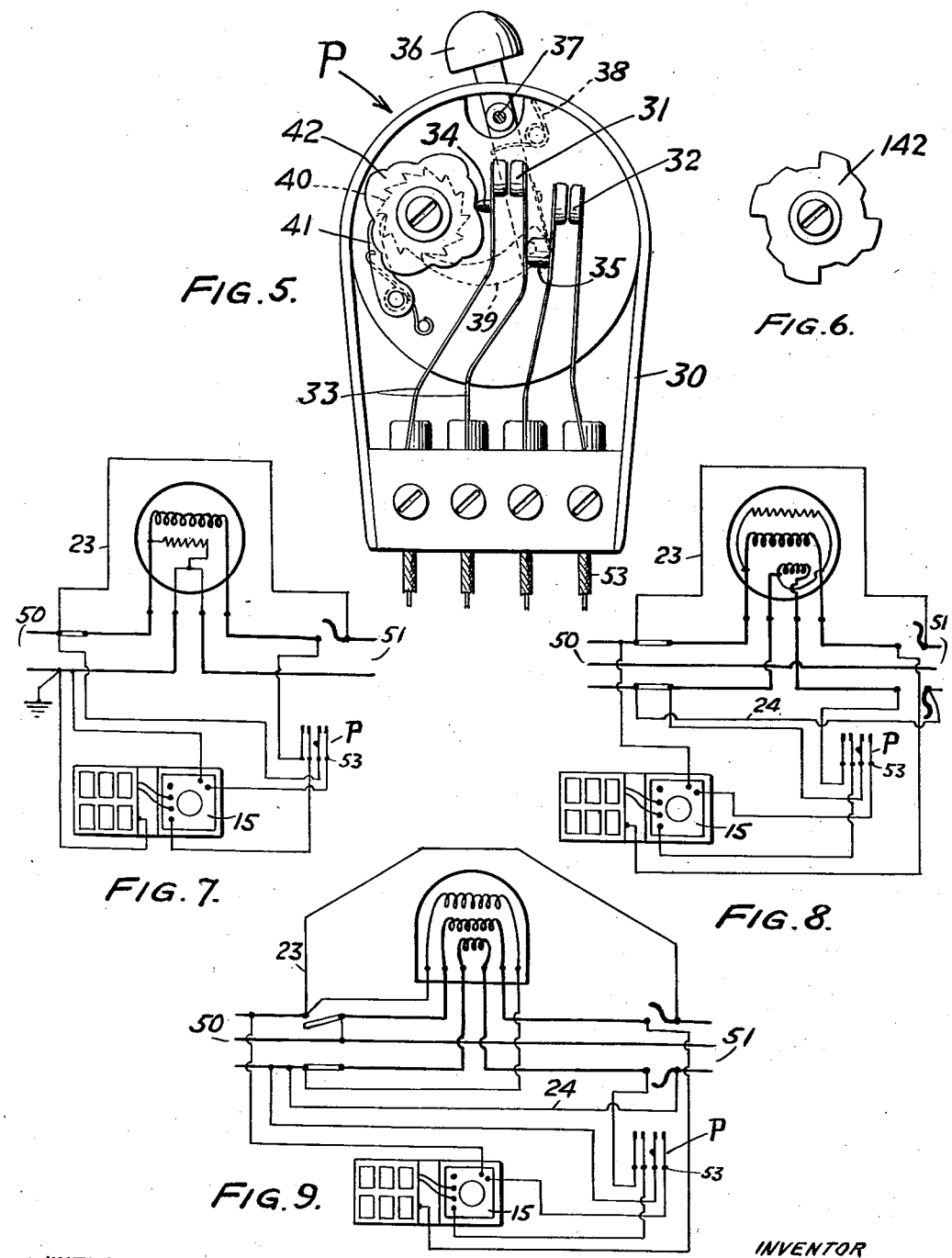

Patented Sept. 14, 1937

2,093,178

UNITED STATES PATENT OFFICE 2,093,178

ELECTRIC METER TESTING EQUIPMENT

Walter C. Wagner, Ardmore, Pa., assignor to Edwin L. Wiegand Company, Pittsburgh, Pa., a corporation of Pennsylvania Application March 19, 1935, Serial No. 11,775

24 Claims. (Cl. 175—183)

My invention relates to an assembly of equipment primarily designed for efficient meter testing of electric watthour meters.

Present methods of loading meters for test are fundamentally of two types:

(1) A so-called phantom-load device, in which the test current is obtained from the secondary of a low-voltage transformer, and (2) The resistance-load method, in which meters are tested under actual loads connected to the voltage of the supply.

For meters of a given size, the equipment required for the phantom-load method has been generally smaller in size and lighter in weight, but particularly in the testing of three-wire meters, the test connections are simpler with the resistance method. The latter method is therefore conducive to greater economies because of the lesser time required for connections.

One object of my invention has been the development of an assembly which combines the ease of testing by the resistance method with the lighter weight which is characteristic of the phantom-load equipment.

Another object of my invention has been the development of a resistance-loading device suitable for meter testing so constructed as to reduce maintenance costs to a minimum.

The third object of my invention has been to combine the resistance-loading device with the carrying case which contains the portable test meter, the test leads and the required tools and parts; and to design an equipment which, by the proper combination of heat storage and radiation characteristics, would permit of reducing the loading device to the minimum dimensions and lowest weight.

A fourth object of my invention has been the development of a test switch which permits a reduction in the time during which the test circuit is energized, so that the total heat which must be dissipated by the loading device is reduced to the minimum.

Yet another object of my invention is the provision of novel electric circuits including the meter to be tested, a standard meter for comparison with the meter to be tested, resistance units forming the loads for the meters under test, a pendant switch in the test leads connecting the standard meter with the meter to be tested, and switches controlling the connection of the resistance units to the meters, certain of said switches being interlocked so as to guard against improper connections.

A still further and important feature of my invention is the provision of metal clad resistance units, which are equipped with fins to secure increased radiation and consequent dissipation of the heat developed in the resistance units during test.

The inventor is familiar with meter testing load devices which consist of resistance units either in the form of grids or wound resistance cards in which the resistance elements are protected by a ceramic material. Such devices in the past have also been equipped with fans to increase the radiation, but prior to the novel means of my invention it had not been practical to operate the loading device as an integral part of a one-piece one-man test equipment.

There has been selected from the many embodiments which my invention may take one embodiment chosen for description in the specification and illustration in the drawings. This description and illustration form a complete showing of my invention, to which reference is now made. At the end of my specification the novel features of my invention will be specifically pointed out and claimed.

In the drawings:

Fig. 5 is a face view of the pendant switch, with the cover removed.

Fig. 6 is a detail view of a modified form of cam.

Figs. 7, 8 and 9 are electric diagrams showing the way in which my device may be connected with various circuits and types of meters.

Figure 2:
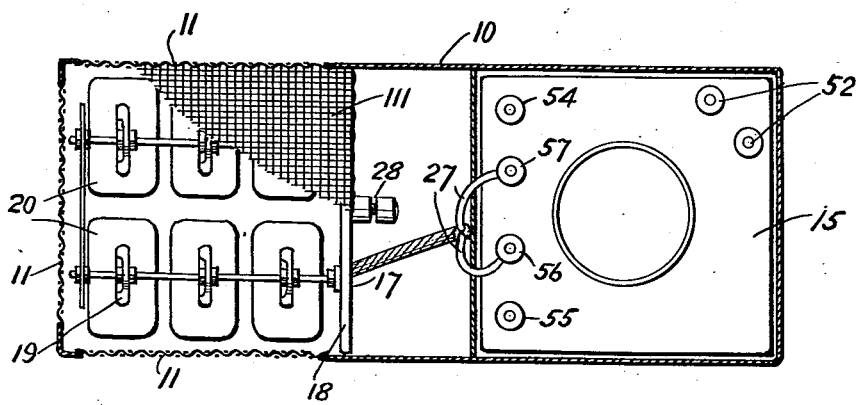
Fig. 2 is a top plan view of the case with the top and tray omitted, and with parts broken away in horizontal cross-section.

My device is shown as consisting of a carrying case 10, preferably made of fiber or similar material and having at one end, and at the two sides adjacent said end, openings, which are closed by screens 11, to protect the internal parts from mechanical injury or electric short circuit. At the top, case 10 contains a tray 12 which provides space for tools and miscellaneous equipment. A cover 13 is provided for the top of the case and the tray. A strap 14 is provided for conveniently carrying the case. Within the case is carried a portable test meter, generally indicated at 15 and supported upon a cushion 16 of sponge rubber or like material. Adjacent the openings covered by screens 11, case 10 carries a partition, such as a metal plate 17 covered by a layer 18 of asbestos or similar heat and electricity resistant material. Opposite the openings covered by screens 11 is the loading device assembly, which forms an important feature of my invention. The loading device assembly consists of a plurality of metal resistance units 19, each of which is equipped with fins 20 which provide increased radiation and consequent dissipation of the heat units in the loading units during a test. It will be readily understood that any other form of resistance unit, which possesses the proper combination of radiation and heat storage characteristics, may be substituted for the units shown. Units 19 are the full-load units. Resistance units 21 are mounted on partition 17 and form the light-load units. Because of the lesser amounts of energy to be dissipated by the units 21, they are not provided with fins. The loading assembly is protected at its top from mechanical injury or electric short circuiting by an additional screen 111.

Figure 1:
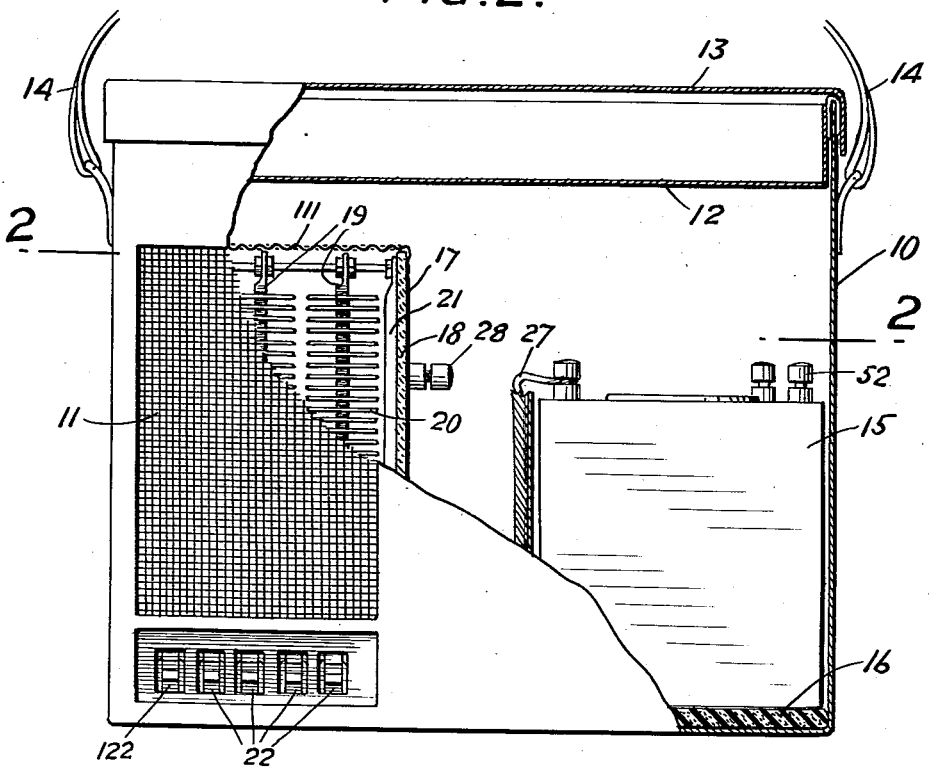
Fig. 1 is a side elevation of my device with parts broken away in vertical cross-section, and with the test leads and connections omitted.

On its opposite sides, case 10 carries a plurality of switches, of which five are indicated at 22 and 122, the others being provided on the opposite side of the case, and hence not shown in Figs. 1 and 2. Between partition 17 and meter 15, and above meter 15, there is provided in case 10 a compartment in which the test leads are carried.

In Fig. 5 there is illustrated a novel form of pendant switch, which may be connected in the test leads and which is generally indicated at P. This switch consists of a casing 30 having two pairs of contacts 31 and 32, each mounted on flexible supports 33 within casing 30. Contacts 31 have a follower 34 connected to one of their supports 33. Contacts 32 have a follower 35 connected to one of their supports 33. A handle 36 is pivotally mounted at 37 in casing 30 and is stressed by spring 38 to one extreme position. On the opposite side of pivot 37 from handle 36 is pivoted a pawl 39 which actuates a ratchet 40, the ratchet 40 being held against reverse movement by a spring-pressed pawl 41. Mounted so as to turn with ratchet 40 is a cam 42, on whose surface follower 34 rides. Cam 42 has surfaces at three levels thereon, so that, from the position shown in Fig. 5, the first actuation of handle 36 closes contacts 31. The second actuation of handle 36 causes contacts 31 to close contacts 32 through follower 35, contacts 31 remaining closed. The third movement of handle 36 causes follower 34 to lodge in a low position on cam 42, and permits contacts 31 and contacts 32 to both open. Cam 42 has four such series of faces, one on each quadrant. By the use of switch P, the time during which the test circuits are energized is reduced, so that the total heat which must be dissipated by the loading device is reduced to a minimum.

Figure 3:
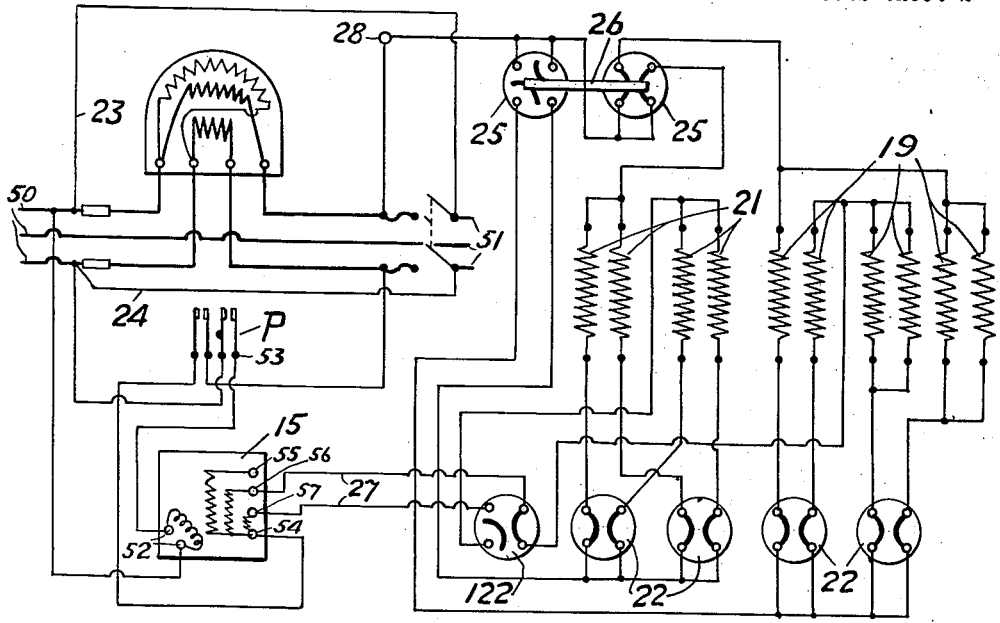
Fig. 3 is an electric diagram of one embodiment of my device connected for a test.

In Fig. 3 is shown an electric diagram of the circuit connections of my device as connected to the meter on the consumer's premises, which is the meter to be tested. The permanent circuits in the consumer's premises are indicated in heavy lines. Jumpers 23 and 24 are employed, so as to carry any current being used on the premises while the consumer's meter is being tested. Switches 22 and 122, shown in Fig. 1, provide for test currents for light-load and full-load tests for 5-, 10- and 15-ampere meters. The opposite side of the switch compartment includes the combination switches 25, which are interlocked together as indicated at 26, (not shown in Fig. 1) for testing 115- and 230-volt meters. The connections of the full-load units 19 and the light-load units 21 are shown. Switch 122 is arranged so as to open one circuit while closing the other, and vice versa. In tracing the connections, it will be seen that for the 115-volt connection one set of units is used, while for the 230-volt connection two sets of units are used.

In operating the equipment, the tester places the switches in their proper positions; i. e., for testing a 230-volt 10-ampere meter the voltage switches 25 are placed in the 230-volt position, the appropriate switch 22 for 10 amperes, and the appropriate switch 22 for 1 ampere, are closed. In testing heavy loads, the full-load and light-load switch 122 is placed in the full-load position, and, in shifting to the light-load test, it is only necessary to change this switch to light-load position.

Fig. 6 is a detail view showing a modified form of cam 42. This cam 142 has radially extending faces, which give a sharp make-and-break action.

Figure 4:
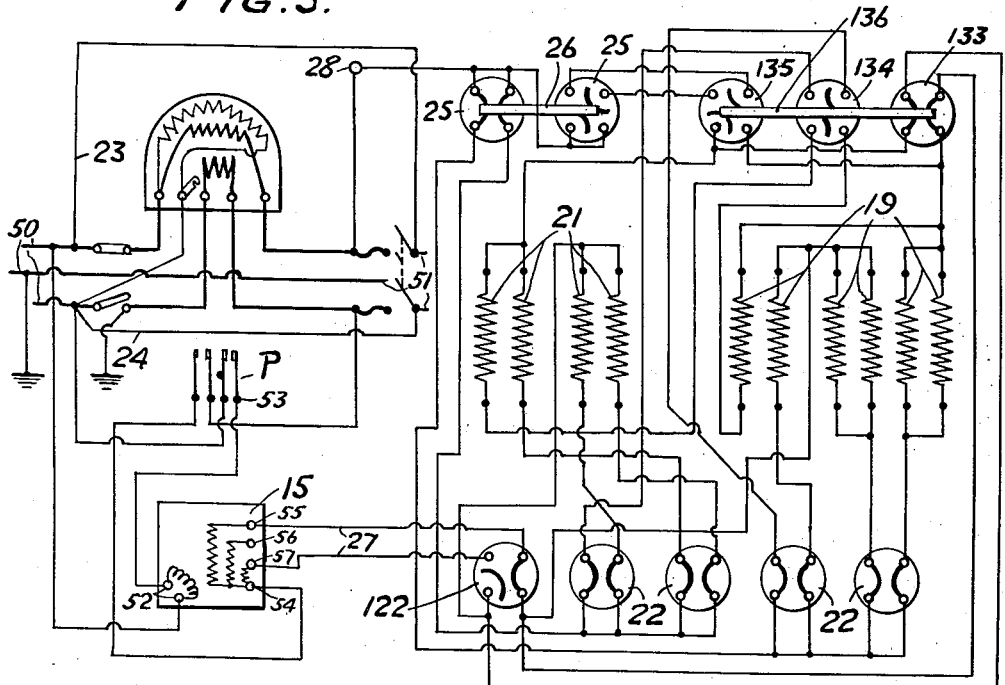
Fig. 4 is an electric diagram of another modification of my device.

The modification shown in Fig. 4 uses the same connection shown in Fig. 3, except that additional switches 133, 134 and 135 have been added to permit of a load of 25 amperes at 115 volts. Switches 133, 134 and 135 are interlocked as shown at 136. This loading is accomplished by connecting the light-load and full-load units respectively in parallel by switch 133 and opening the circuit to one of the 0.5-ampere and one of the 5-ampere units by switch 134. The third switch 135 in the combination serves to prevent a short circuit in the event that voltage switches 25 have accidentally been left in the 230-volt position for this connection.

In testing meters with this novel device, two-wire and three-wire meters are tested in accordance with the connections shown in Figs. 7 and 8, respectively, while for testing 25-ampere three-wire meters the load is connected between one side of the line and the neutral wire or ground, and in the case of a three-wire meter the two current coils are connected in series. The latter connections are shown in Fig. 9. In all of the diagrams the electric service supply is at 50, and the customer's load is connected at 51.

The test equipment assembly permits successive tests at different locations to be made without disconnecting the loading device and the test leads from the test equipment; and, in using the equipment in the field, it is only necessary to make the connections to the meter under test. Connections 27, and the connections to terminals 28, 52, 53, 54 and 57, and to the pendant switch, all remain connected until portable test meter 15 is removed for its periodic accuracy check. The connection to terminals 55 and 56 serves to select the proper current coil winding of the portable test meter for use with the service meter to be tested.

I do not intend to be limited save as the scope of the prior art and of the attached claims may require.

I claim:—

1. A watthour meter test equipment comprising, a carrying case having perforations in one end and in two sides thereof adjacent said end, resistance units mounted in said case opposite said openings, switches mounted in said case and connected to said units so as to selectively connect said units, certain of said switches being interlocked together so as to prevent undesired connections, a portable test meter in said case, and a support of resilient material for said test meter.

2. A watthour meter test equipment comprising, a casing having openings in one end and in opposite sides thereof adjacent said end, metal clad resistance units mounted in said casing opposite said openings so that heat from said units may escape through said openings, switches mounted in said casing connected to said resistance units for selectively connecting said units, a portable test meter carried in said casing, test leads connected to said test meter and to said resistance units and adapted for connection to a meter to be tested, and a pendant switch in said test leads having two pairs of contacts therein under the control of a cam.

3. Electric meter testing equipment, comprising, electrical load means, a test meter having a current circuit and a potential circuit, means for connecting said current circuit in a circuit in series with said load and the current circuit of a meter to be tested and a supply circuit, and for connecting said potential circuit in shunt with the supply circuit; and said connecting means including switch means, having a single actuator, for controlling both said series circuit and said shunt circuit.

4. A load for electric meter testing, comprising: a plurality of groups of resistors, said groups respectively serving to provide loads of different predetermined ranges when connected to a given circuit at a predetermined electromotive force, switch means for connecting a selected one of said groups to the circuit, and switch means for varying the load provided by said selected group.

5. In combination, in electric meter testing equipment: a test meter; electrical load means; electrical connections between said test meter and said load means; said load means comprising a plurality of resistors; connecting means, including electrical connections, for rendering certain of said resistors and said test meter suitable, in one set-up, for connection to a meter to be tested operating at a predetermined electromotive force and, in another set-up, suitable for connection to a meter to be tested operating at a predetermined different electromotive force; and switch means controlling said connecting means for changing from one of said set-ups to another.

6. A load for electric meter testing, comprising: a plurality of resistors; connecting means, including electrical connections, constructed and arranged to render certain of said resistors suitable, in one set-up, for connection to a circuit of predetermined electromotive force and, in another set-up, suitable for connection to a circuit of different predetermined electromotive force; switch means, controlling said connecting means, constructed and arranged to change from one of said set-ups to another; means for connecting said resistors in a plurality of groups for each of said set-ups; and switch means so constructed and arranged that the load provided by each group may be varied.

7. A load for electric meter testing, comprising: a major group of resistors including a plurality of minor groups of resistors, each minor group having opposite sets of terminals, a common conductor, switch means constructed and arranged to connect one or more terminals of one set of terminals of a first minor group to said common conductor and at the same time to connect one or more terminals respectively of a set of terminals of a second minor group to said common conductor, means for connecting the opposite set of terminals of one of said minor groups to a source of current, and switch means constructed and arranged to connect either said common conductor or the opposite set of terminals of the other minor group to the other terminal of the source of current.

8. In combination: variable load means for electric meter testing; a test meter, having actuating means and a plurality of terminals therefor; said test meter being so constructed and arranged that electrical loads of the same value will produce different actuating forces in the actuating means of said meter when said load means is connected to different ones of said terminals; and switch means for selecting the load effect which will be produced by said load means in a given circuit, so constructed and arranged that for one selected load effect said load means is connected to one of said terminals and for a different selected load effect said load means is connected to a different one of said terminals.

9. Electric meter testing equipment, comprising, unitary portable apparatus, including a single receptacle containing electrical load means and a test meter, said load means and said test meter having terminal means connectable to a source of current through a meter to be tested and having opposite terminal means connectable to each other, electrical connection means for connecting said opposite terminal means, and switch means, mounted unitarily with said receptacle, interposed in said electrical connection means, constructed and arranged to control said electrical connection means.

10. A load for electric meter testing, comprising: a plurality of resistors; connecting means, including electrical connections, constructed and arranged to render certain of said resistors suitable, in one set-up for connection to a circuit of predetermined electromotive force and, in another set-up, suitable for connection to a circuit of different predetermined electromotive force; switch means, controlling said connecting means, constructed and arranged to change from one of said set-ups to another; means for connecting said resistors in a plurality of groups for each of said set-ups; and switch means for connecting a selected one of said groups to a source of current.

11. A load for electric meter testing, comprising: a plurality of resistors; connecting means, including electrical connections, constructed and arranged to render certain of said resistors suitable, in one set-up for connection to a circuit of predetermined electromotive force and, in another set-up, suitable for connection to a circuit of predetermined electromotive force; switch means, controlling said connecting means, constructed and arranged to change from one of said set-ups to another; means for connecting said resistors in a plurality of groups for each of said set-ups; switch means for connecting a selected one of said groups to a source of current; and switch means so constructed and arranged that the load provided by each group may be varied.

12. A load for electric meter testing, comprising: a series of normally disconnected resistors; switch means, including connections, constructed and arranged to individually connect adjacent terminals of resistors in said series to each other so that when all of said switch means are closed said series of resistors of normally disconnected resistors will form a joined electrical series; switch means, including connections, so constructed and arranged that either the end terminal at one end of said series or a selected electrical junction between adjacent resistors of said series may be connected to a terminal of a source of current; and means for connecting the end terminal at the other end of said series to the other terminal of the source of current.

13. A load for electric meter testing, comprising: a first series of normally disconnected resistors; a second series of normally disconnected resistors; switch means, including connections, constructed and arranged to individually connect adjacent terminals of resistors in the respective series to each other so that when all of said switch means are closed each respective series of resistors of normally disconnected resistors will form a joined electrical series respectively; switch means, including connections, so constructed and arranged that either the end terminals at one end of said respective series or a selected set of electrical junctions between adjacent resistors of said respective series may be connected to a terminal of a source of current; and means for connecting the end terminals at the other end of said respective series to the other terminal of the source of current.

14. A load for electric meter testing, comprising: at least two groups of resistors each group including a series of normally disconnected resistors; switch means, including connections, constructed and arranged to individually connect adjacent terminals of resistors in each of said respective series to each other so that when all of said switch means are closed each respective series of resistors of normally disconnected resistors will form a joined electrical series; switch means, including connections, so constructed and arranged that either the end terminals at one end of said respective series or selected electrical junctions between adjacent resistors of series of different ones of said groups may be connected to a terminal of a source of current; and means for connecting either the end terminal at the other end of one of said series or the end terminal at the other end of a series of a different one of said groups to the other terminal of the source of current.

15. A load for electric meter testing, comprising: at least two major groups of resistors each group including a plurality of minor groups of resistors, each minor group having opposite sets of terminals, a common conductor, switch means constructed and arranged to connect one or more terminals of one set of terminals of a first minor group of each of said major groups to said common conductor and at the same time to connect one or more terminals respectively of a set of terminals of a second minor group of each of said major groups to said common conductor, means for selectively connecting the opposite set of terminals of one of said minor groups of either of said major groups to a source of current, and switch means constructed and arranged to connect either said common conductor or the opposite set of terminals of the other minor group of each of said major groups to the other terminal of the source of current.

16. A load for electric meter testing, comprising: a plurality of series connectable resistors; first switch means, including connections, so constructed and arranged that, in one position of said first switch means, the end terminal at one end of said series, and, in a second position of said first switch means, a selected electrical junction between adjacent resistors of said series may be connected to a terminal of a source of current; second means for connecting the end terminal at the other end of said series to the other terminal of the source of current; and auxiliary switch means, including connections, so constructed and arranged that said end terminals may be connected to each other and so that short circuiting of the source will be prevented when said first switch means is in said first position and said second means is connected to the source.

17. A load for electric meter testing, comprising: a series of normally disconnected resistors; first switch means, including connections, constructed and arranged to individually connect adjacent terminals of resistors in said series to each other so that when all of said first switch means are closed said series of resistors of normally disconnected resistors will form a joined electrical series; second switch means, including connections, so constructed and arranged that, in a first position of said second switch means, the end terminal at one end of said series, and, in a second position of said second switch means, a selected electrical junction between adjacent resistors of said series, may be connected to a terminal of a source of current; third means for connecting the end terminal at the other end of said series to the other terminal of the source of current; and auxiliary switch means, including connections, so constructed and arranged that said end terminals may be connected to each other and so that short circuiting of the source will be prevented when said second switch means is in said first position and said third means is connected to the source.

18. Electric meter testing equipment, comprising, unitary portable apparatus, including a single receptacle containing electrical load means and a test meter, said load means including at least two major groups of resistors, said load means and said test meter having terminal means connectable to a source of current through a meter to be tested and having opposite terminal means connectable to each other, electrical connection means for connecting said opposite terminal means, and switch means, mounted unitarily with said receptacle, interposed in said electrical connection means, constructed and arranged to control said electrical connection means so that a selected one only of said major groups has its said opposite terminal means connectable to said opposite terminal means of said test meter.

19. Electric meter testing equipment, comprising, unitary portable apparatus, including a single receptacle containing electrical load means and a test meter having a current circuit and a potential circuit, and connection means for connecting said current circuit in a circuit in series with said load and the current circuit of a meter to be tested and a supply circuit, and for connecting said potential circuit in shunt with said supply circuit, so constructed and arranged that said connection means may be left in the same state in transferring said testing equipment from a test of a meter at one site to a test of a meter at another site, said connection means including switch means, having a single actuator, constructed and arranged to control both said series circuit and said shunt circuit.

20. In combination: at least two groups of resistors each group including a series of normally disconnected resistors; switch means, including connections, constructed and arranged to individually connect adjacent terminals of resistors in each of said respective series to each other so that when all of said switch means are closed each respective series of resistors of normally disconnected resistors will form a joined electrical series; switch means, including connections, so constructed and arranged that either the end terminals at one end of said respective series or selected electrical junctions between adjacent resistors of series of different ones of said groups may be connected to a terminal of a source of current; a test meter, having actuating means and a plurality of terminals therefor; said test meter being so constructed and arranged that electrical loads of the same value will produce different actuating forces in the actuating means of said meter when said meter is supplied with current through different ones of said terminals; and switch means, including connections, constructed and arranged either to connect the end terminal at the other end of one of said series to one of the terminals of said test meter or to connect the end terminal at the other end of a series of a different one of said groups to a different one of the terminals of said test meter.

21. Electric meter testing equipment, comprising, unitary portable apparatus, including a single carrying receptacle, electrical load means of the resistor type in said receptacle, a test meter in said receptacle, means removably retaining said load means and said test meter in definite respective positions in said receptacle, and electrical connection means, within said receptacle, connected at one end to said load means and at the other end to said test meter.

22. Electric meter testing equipment, comprising: unitary portable apparatus, including a single carrying receptacle, electrical load means in said receptacle, a test meter in said receptacle, means removably retaining said load means and said test meter in definite respective positions in said receptacle, said load means including a metal clad resistor element, and said receptacle being provided with openings so constructed and arranged with respect to the position of said load means as to permit movement of air through said openings into heat abstracting relation with said resistor element.

23. Electric meter testing equipment, comprising, unitary portable apparatus, including a single carrying receptacle, electrical load means of the resistor type in said receptacle, a test meter in said receptacle, means removably retaining said load means and said test meter in definite respective positions in said receptacle, electrical connection means, within said receptacle, connected at one end to said load means and at the other end to said test meter, and switch means, mounted in said receptacle, so constructed and arranged that when said equipment is connected to a meter to be tested the amount of load provided by said load means may be varied by operation of said switch means.

24. Electric meter testing equipment, comprising: unitary portable apparatus, including a single carrying receptacle, electrical load means in said receptacle, a test meter in said receptacle, means removably retaining said load means and said test meter in definite respective positions in said receptacle, said load means including a metal clad resistor element provided with transversely extending heat dissipating fin means, and said receptacle being provided with openings so constructed and arranged with respect to the position of said load means as to permit movement of air through said openings into heat abstracting relation with said resistor element.

WALTER C. WAGNER.